2,714,621

PROCESS FOR PREPARING 2,5-DIPHENYL-1-HEXENE FROM ALPHA-METHYLSTYRENE

Milton J. Hogsed, Wilmington, Del., assignor to E. I. du Pont de Nemours and Company, Wilmington, Del., a corporation of Delaware No Drawing. Application January 9, 1952, Serial No. 265,727

3 Claims. (Cl. 260—669)

This invention relates to a new organic compound, to a process for its preparation and to polymers of the new organic compound. More particularly this invention relates to a new dimer of alpha-methylstyrene which is polymerizable, to a process for preparation of this new dimer and to polymers thereof.

Unsaturated compounds, particularly those containing a terminal ethylenic double bond, are used extensively in the preparation of highly polymeric materials for various uses such as in coating compositions, molded articles and fibers. These high polymers are usually prepared by heating the monomer with a suitable catalyst, such as an organic peroxide. This reaction generally yields exclusively high polymer with little or no low polymer in the dimer or trimer range being formed. In some instances it has been possible by heating the monomer in the absence of a catalyst, and preferably in the presence of a polymerization inhibitor, to obtain a dimer.

However, the conversion of monomers to dimers is not a general reaction. Some monomers, for example vinyl chloride, do not appear to be susceptible to dimerization. With other monomers, the course of the dimerization reaction is dependent upon conditions with the result that dimers of different structure are obtained depending upon the conditions of the reaction. Dimers of particular interest are those which contain ethylenic unsaturation and which on heating with a peroxy or other polymerization catalyst can be converted into polymers which differ from those obtained by heating the monomer with a polymerization catalyst.

Heretofore, alpha-methylstyrene, which is difficult to convert to high polymers, has been dimerized by treatment with an acid (Bergmann et al., Ber. 64, 1493, 1494 (1931)). This reaction yields an aliphatically saturated dimer and an aliphatically unsaturated dimer of the following structures:

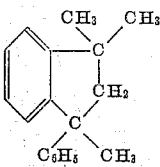

and

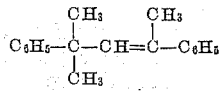

Neither of these dimers is readily polymerizable.

It is an object of this invention to provide a new organic compound and a method for its preparation. A further object is to provide a new dimer of alpha-methylstyrene which is polymerizable and a process for preparing this new dimer. Another object is to provide novel polymers of this new dimer of alpha-methylstyrene. Other objects will appear hereinafter.

The objects of this invention are accomplished by providing the new chemical compound 2,5-diphenyl-1-hexene and polymers thereof. It has now been found that this new and polymerizable dimer of alpha-methylstyrene can be prepared by heating alpha-methylstyrene under pressure at a temperature of 200 to 400° C. The reaction is preferably carried out at about 300° C. in the presence of a polymerization inhibitor and of a solvent. The formation of this new dimer, 2,5-diphenyl-1-hexene, is illustrated in the following equation:

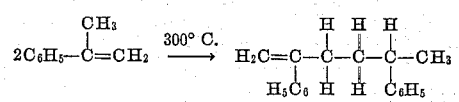

2,5-diphenyl-1-hexene is a colorless liquid which boils at 144–145° C./3 mm. and has a refractive index of $n_D^{25}$ 1.5621. The compound cyclizes readily to a compound having two optically active carbons according to the following reaction:

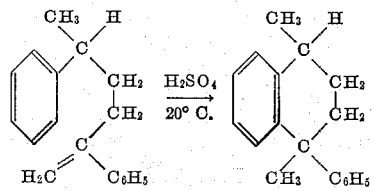

(B. P. 155° C./3 mm., $n_D^{25}$ 1.5801). 2,5-diphenyl-1-hexene can also be polymerized to high molecular weight linear polymers and copolymers.

The following examples, in which parts are by weight, illustrate the preparation, characterization, and polymerization of 2,5-diphenyl-1-hexene.

Example I

An autoclave was flushed with nitrogen and charged about ⅔ full with 100 parts alpha-methylstyrene, stabilized with a small amount of hydroquinone, and 80 parts of toluene. After flushing the free space with nitrogen, the autoclave was closed and heated rapidly to 300° C. and held at this temperature for 20 minutes. The reaction mixture was cooled and distilled. In addition to recovered toluene and alpha-methylstyrene, there was obtained 14 parts of 2,5-diphenyl-1-hexene, B. P. 144–145° C. 3 mm., $n_D^{25}$ 1.5621, representing 14% conversion. Material boiling higher than the dimer amounted to less than 2 parts.

*Anal.*—Calculated for $C_{18}H_{20}$: C, 91.47; H, 8.53. Found: C, 90.79; H, 8.73.

The structure of the alpha-methylstyrene dimer, 2,5-diphenyl-1-hexene, was determined by ozonization and identification of gamma-phenylvalerophenone and formaldehyde among the products as follows:

Thirty parts of the above mentioned product boiling at 144–145° C./3 mm. was ozonized in about 240 parts of absolute ethanol until no further test for unsaturation was given on the addition of bromine. After removal of excess ozone by a nitrogen stream, the ozonide was hydrogenated at 40 lbs. hydrogen pressure using palladium-on-charcoal catalyst. Thirty parts of water was added and the mixture distilled. The large quantity of formaldehyde produced was identified by formation of the 2,4-dinitrophenylhydrazone, M. P. and mixed M. P. 165–167° C. Of the higher boiling material, B. P. 144–150° C./1 mm., 16 parts was distilled. The distillation was stopped to avoid over-heating any ozonide which might have been present, leaving about 10 parts in the pot. The material boiling at 144–150° C./1 mm.

gave a negative Fehling's test but a positive carbonyl test and was, therefore, a ketone. The 2,4-dinitrophenylhydrazone (analysis below) prepared from this ketone melted at 150–151° C. alone or when mixed with authentic gamma-phenylvalerophenone 2,4-dinitrophenylhydrazone.

*Anal.*—Calcd. for $C_{23}H_{22}O_4N_4$: C, 66.01; H, 5.30; N, 13.39. Found: C, 66.03; H, 5.53; N, 13.43.

Example II

An autoclave was flushed with nitrogen and charged about ½ full with 150 parts of alpha-methylstyrene, stabilized with hydroquinone, and 80 parts of toluene. After flushing the void with nitrogen, the autoclave was closed and heated rapidly to 300° C. and held at this temperature for 120 minutes. The reaction mixture was cooled and distilled. Toluene and alpha-methylstyrene, 155 parts total, were flash distilled. Fifty-one parts (34% conversion) of 2,5-diphenyl-1-hexene was obtained, B. P. 134–138° C./1–2 mm. High boiling fractions, probably trimer, totaled 14 parts.

Example III

A catalyst mixture comprising seven parts of 30% hydrogen peroxide, 0.5 part of thiourea and 50 parts of distilled water was added to 15 parts of 2,5-diphenyl-1-hexene and 1 part of the sodium salt of technical lauryl sulfate. The reaction mixture was stirred overnight and the organic material was separated by ether extraction. After removal of volatile material by distillation, 6 parts of 2,5-diphenyl-1-hexene polymer was obtained as a viscous, colorless oily residue.

Example IV

A solution containing 160 parts 2-chloro-1,3-butadiene, 40 parts 2,5-diphenyl-1-hexene, 0.68 part dodecyl mercaptan and 1.2 parts alpha,alpha'-azobis(alpha,gamma-dimethylvaleronitrile) was emulsified at room temperature in a solution containing 452 parts water, 12.2 parts of a synthetic emulsifying agent prepared in accordance with Example I of U. S. Patent 2,163,133 and 1.0 part of a formaldehyde/sodium naphthalene sulfonate condensation product. The emulsion was stirred slowly and heated under a blanket of nitrogen to a temperature of 40° C. The polymerization started within 10 minutes at this temperature as evidenced by a rise in the temperature of the emulsion. The polymerization was continued for 3.9 hours at 40–42° C., during which time the specific gravity of the emulsion rose from 0.980 to 1.037. The copolymer was stabilized at this point by addition of 26 parts of a stabilizer prepared by emulsifying a solution containing 0.4 part of phenothiazine, 0.4 part of p-tertiary-butyl-catechol, and 70.4 parts of benzene in a solution containing 120 parts of water, 1.2 parts of the sodium salt of technical lauryl sulfate, and 0.6 part of the formaldehyde/sodium naphthalene sulfonate condensation product mentioned above. Coagulation of 50 parts of the polymer latex in 213 parts of methanol gave an elastic polymer which was purified by washing with benzene and methanol. The colorless, elastic product thus obtained amounted to 12.05 parts which corresponds to a conversion of 84%. Chlorine analyses indicated that the product contains 9.2 weight per cent 2,5-diphenyl-1-hexene.

A sample of the copolymer was compounded on a rubber mill by the addition of the following ingredients in the order given:

| Ingredients: | Parts by weight |
|---|---|
| Copolymer of Example IV | 100.00 |
| Stearic acid | 0.5 |
| Phenyl-beta-naphthylamine | 2.0 |
| Extra light calcined magnesia | 10.0 |
| Semi-reinforcing furnace black | 29.0 |
| Zinc oxide | 10.0 |
| 2-mercaptoimidazoline | 0.5 |

The resulting composition was then cured by heating at 153° C. for 40 minutes. The vulcanizate had a tensile strength (at break) of 1900 lbs./sq. in. and elongation (at break) of 340%, a brittle point of −43° C., a Shore hardness of 50, compression set of 14%, resilience of 80%, and showed a volume increase of 58% after immersion in ASTM #3 oil for three days at 100° C.

Although the preparation of the 2,5-diphenyl-1-hexene of this invention is preferably carried out at a temperature of 300° C., temperatures as low as 200° C. and as high as 400° C. can be used. The reaction is conveniently carried out in the liquid phase under autogenous pressure, which will generally be in the range of 5 to 60 atmospheres. However, there is no upper limit to the pressure which can be used. The presence of a polymerization inhibitor (e. g., 0.1 to 5.0% based on the weight of the alpha-methylstyrene), such as hydroquinone or diphenylamine, is desirable in the thermal dimerization of alpha-methylstyrene, but is not essential.

The reaction can also be carried out in the presence or absence of an inert solvent. Any organic solvent which is non-reactive with alpha-methylstyrene and which is not thermally polymerized, i. e., free from C=C olefinic unsaturation, can be used. Solvents, in addition to the toluene of the examples, which can be used include ethyl acetate, benzene, xylene, and the like. Chlorinated hydrocarbons, such as trichloroethylene are not suitable as solvents.

The polymerization and copolymerization of the 2,5-diphenyl-1-hexene may be effected by free-radical producing initiators, including organic peroxides, persulfates and the azonitriles of Hunt U. S. Patent 2,471,959.

The 2,5-diphenyl-1-hexene will copolymerize with other ethylenically unsaturated compounds in addition to the 2-chloro-1,3-butadiene of Example IV. These unsaturated compounds include 1,3-butadiene and substituted butadienes, e. g., 2-methyl and cyano butadienes; vinyl and vinylidene halides, such as vinyl fluoride, 1,1-dichloroethylene; acrylic and methacrylic acids and derivatives, such as methyl methacrylate, acrylonitrile, methacrylamide; olefinic hydrocarbons, such as ethylene, styrene; and other polymerizable unsaturates such as tetrafluoroethylene, diethyl fumarate, and the like. The ratio of 2,5-diphenyl-1-hexene to other polymerizable component of the copolymers can be varied widely but in general at least 2%, and preferably 5 to 75% of the copolymer will consist of 2,5-diphenyl-1-hexene.

The polymers and copolymers of this invention are useful in the preparation of adhesive, coating and plastic compositions, the copolymers with chloroprene being particularly useful as elastomers which can be vulcanized to form hard, strong molded articles, which become brittle only at very low temperatures.

As many apparently widely different embodiments of this invention may be made without departing from the spirit and scope thereof, it is to be understood that this invention is not limited to the specific embodiments thereof except as defined in the appended claims.

I claim:

1. Process for the preparation of 2,5-diphenyl-1-hexene which comprises heating alpha-methylstyrene in the presence of a polymerization inhibitor under pressure at a temperature of 200 to 400° C., and isolating from the reaction mixture 2,5-diphenyl-1-hexene as the resulting product.

2. Process for the preparation of 2,5-diphenyl-1-hexene which comprises heating alpha-methylstyrene in an inert organic solvent in the presence of a polymerization inhibitor under pressure at a temperature of 200 to 400° C., and isolating from the reaction mixture 2,5-diphenyl-1-hexene as the resulting product.

3. Process for the preparation of 2,5-diphenyl-1-hexene which comprises heating alpha-methylstyrene in an inert organic solvent in the presence of a polymerization inhibitor under pressure at a temperature of about 300° C., and isolating from the reaction mixture 2,5-diphenyl-1-hexene as the resulting product.

References Cited in the file of this patent

UNITED STATES PATENTS

| | | |
|---|---|---|
| 2,429,719 | Hersberger | Oct. 28, 1947 |
| 2,595,581 | Highet | May 6, 1952 |

FOREIGN PATENTS

| | | |
|---|---|---|
| 524,156 | Great Britain | July 31, 1940 |

OTHER REFERENCES

Bergmann et al., Ber., 64, pages 1493, 1494 (1931).

Egloff: "Reactions of Pure Hydrocarbons," pages 585–590 (1937), Reinhold.